Jan. 23, 1962     C. B. VANN     3,018,120

PIPE JOINT AND METHOD OF MAKING THE SAME

Filed Jan. 22, 1958

INVENTOR.
CLIFTON B. VANN

BY Bonnie, Edmonds, Morton,
Barrows & Taylor

ATTORNEYS

United States Patent Office 3,018,120
Patented Jan. 23, 1962

3,018,120
PIPE JOINT AND METHOD OF MAKING THE SAME
Clifton B. Vann, Wilmington, N.C., assignor to Riegel Paper Corporation, New York, N.Y., a corporation of Delaware
Filed Jan. 22, 1958, Ser. No. 710,491
3 Claims. (Cl. 285—55)

The present invention relates to pipe lines and systems and their construction, and more particularly to a novel and improved joint for pipes lined with plastic, rubber or the like, and to a novel and improved method for making the improved joint.

In connection with pipe lines or systems for carrying corrosive or abrasive substances, for example, it is often desirable or necessary to line the inside of the pipes with a suitable plastic, rubber or like material having anti-corrosion, anti-abrasion or other desired characteristics. And, since it is usually necessary that the piping system be fluid-tight, provision must be made for extending the lining through any joints between abutting sections or lengths of pipe.

In many conventional lined piping system, at least where the piping is of larger sizes, it is common practice to cut the pipe sections to length in the field, or at the job site, after which flanged coupling members are attached to the ends of the pipe sections to permit them to be bolted together. As a general rule, the flanged coupling members are welded to the pipe sections, since heavy duty threading equipment is often difficult to set up at the site of the installation. However, where the piping is lined, welding melts the lining or otherwise destroys its continuity, and it has been found necessary, in the past, to cut the pipe sections and weld the flanges thereon prior to lining and then return them to a plant or station for lining.

In accordance with the present invention, the entire installation work for a lined piping system may be carried out easily and economically, at the job site, using pipe sections which are lined at the time of manufacture, or at least prior to the installation work. To this end, the invention contemplates cutting the lined pipe sections to length, at the job site, inserting in the ends of the pipe sections flanged inserts of lining material, bonding cylindrical portions of the inserts to the pipe lining, as by means of a suitable solvent, coupling the pipe sections together with the insert flanges in butting relation, and sealing the butted insert flanges, as by means of a suitable gasket. The entire operation may be carried out at the job site with simple tools, and the coupled pipe sections are provided with a fluid-tight lining throughout.

In one of its most advantageous forms, the new joint incorporates flanged coupling members, which are attached to the ends of the lined pipe sections by means of bolts extending radially through the lining, the pipe walls and the couplings. The coupling members may be fastened in place by merely drilling radial holes in the pipe ends and inserting bolts, much like carriage bolts, through the holes, from the inside of the pipes. After the coupling members are fastened, the bolt heads are sealed over by the flanged inserts and the pipe sections may be assembled, in butted relation, by bolts or other means connecting adjacent coupling members.

For a better understanding of the invention, reference should be made to the following detailed description and to the accompanying drawing, in which.

Figure 1:
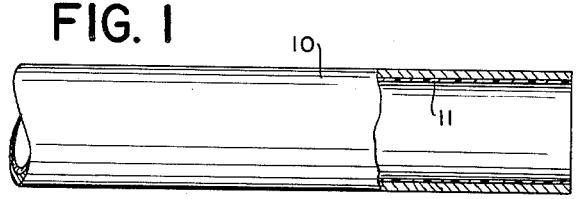
FIG. 1 is a fragmentary view, partly in section, of a section of lined pipe of the type used in making the new joint.

Referring now to the drawing, the reference numeral 10 designates a pipe section, which may be of ordinary construction, but which is provided with a lining 11, of plastic, rubber or other suitable material, extending substantially throughout its length. For convenience of reference, the lining 11 will be referred to hereinafter, and in the claims, as a plastic lining, it being understood, however, that the term plastic is used in its most generic sense, since a variety of lining materials may be used in the new joint.

Figure 2:
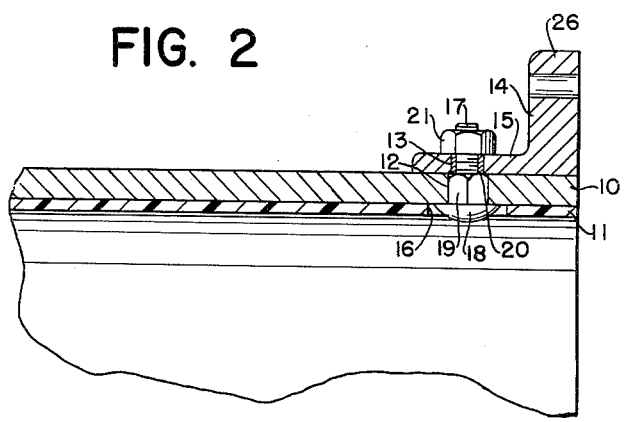
FIG. 2 is an enlarged, fragmentary, cross sectional view of a lined pipe section having a flanged coupling member fastened thereto.

In the installation of a piping system, it is conventional to cut some or all of the pipe sections to proper length, at the job site, to insure proper fitting. In accordance with the present invention, the pipe sections are cut after the lining 11 has been applied, so that the pipe wall and lining are cut simultaneously. In the cut sections, the lining 11 is advantageously flush with the end of the pipe wall, substantially as indicated in FIG. 2.

After a pipe section is cut to length (assuming cutting to be necessary), a plurality of circumferentially spaced, radial holes 12 are drilled through the pipe wall and lining, a predetermined distance in from the end of the pipe section. By way of example only, and not of limitation, a pipe section of eight inch diameter may be provided with eight holes, spaced forty-five degrees apart and located about two and one-half inches in from the end. The number and location of the holes is calculated to conform to the number and location of holes 13 in a flanged coupling member 14, which has a cylindrical body portion 15 adapted slidably to be received over the outside of the pipe section 10. And, wherever desirable or expedient, the coupling member 14 may be used as a guide to facilitate drilling of the holes 12 in the pipe section.

Advantageously, after the holes 12 are drilled, the lining 11 surrounding the holes is cut away to provide recesses 16 of greater diameter than the holes. Any suitable tool or device may be used in forming the recesses 16.

After the holes 12 and recesses 16 have been formed, the flanged coupling member 14 is arranged so that the holes 13 therein are aligned with the holes 12 in the pipe wall. Bolts 17 are then inserted through the aligned holes 12, 13, from the inside of the pipe. Advantageously, the bolts 17 are carriage bolts, having relatively flat, rounded heads 18, square shanks 19, adjacent the heads, and threaded portions 20 extending outward from the square shanks. As shown in FIG. 2, the axial length of the square shanks are such that they extend into the holes 12 in the pipe wall, and, advantageously, the holes 12 are of slightly smaller diameter than the corner-to-corner dimensions of the bolt shanks. The arrangement is such that when the bolts 17 are fully received in the holes 12, the bolts are prevented from rotating by the bite of the square shanks 19. The threaded portions 20 of the bolts are freely received in the holes 12, 13 and are of such length as to project radially outward of the coupling member 14, and the heads 18 of the bolts are of such size, in relation to the recesses 16, as to be substantially fully received in the recesses.

Although the bolts 17 may be inserted in the holes 12, 13 in any manner desired, it may be most expedient to draw them into place by means of nuts 21 which, together with the bolts, secure the flanged coupling member 15 tightly to the pipe section 10. After initially inserting the bolts 17 to a point where the square shanks 19 thereof have a slight bite in the holes 12, tightening of the nuts 21 will draw the shanks farther into the holes and increase the anti-rotational gripping action thereof.

Figure 3:
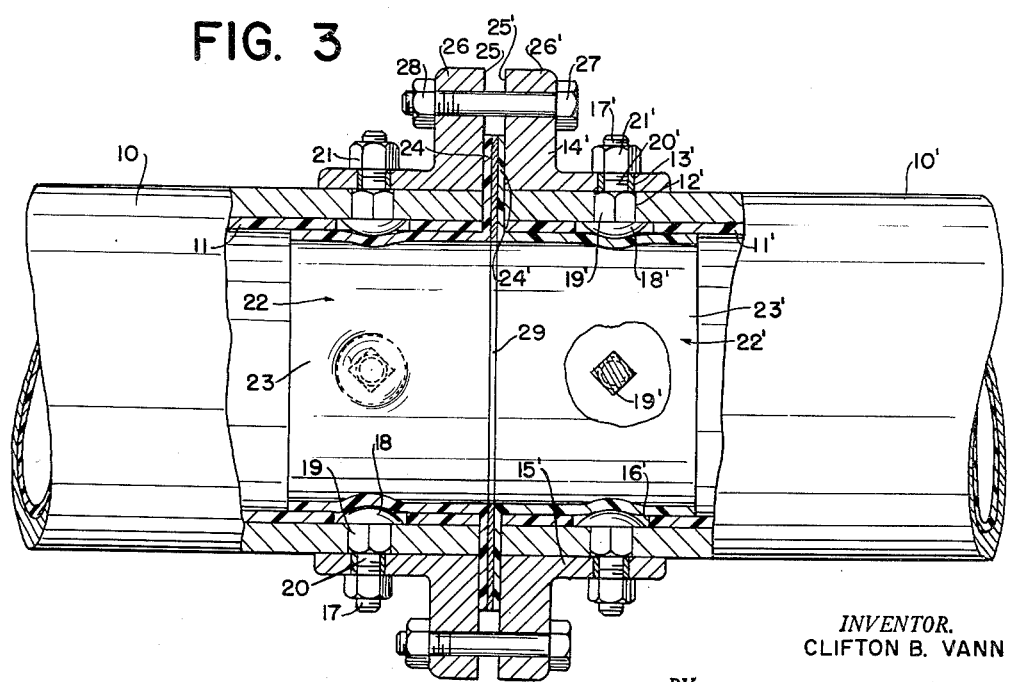
FIG. 3 is an enlarged, fragmentary view, partly in section, of a pipe joint incorporating the features of the invention.

When a coupling member 14 has been secured in place, by assembling and tightening the bolt and nut assemblies 17–21, the bolt heads are sealed over by means of a pre-formed, flanged insert 22 formed of plastic material, advantageously the same material as the lining 11. As shown in FIG. 3, the insert 22 comprises a cylindrical body portion 23 and a radial flange 24. The cylindrical portion 23 has an outside diameter substantially equal to the inside diameter of the pipe liner 11 and is adapted, when inserted inside the pipe, to conform closely to the liner 11. The length of the cylindrical portion 23 is such that, when the insert is fully inserted in the pipe end, the cylindrical portion thereof extends beyond and completely covers the bolt heads 18 and liner recesses 16. The flange portion 24 of the insert is advantageously of such dimensions as to extend radially beyond the end of the lining 11 and pipe 10 and cover at least a portion of the outwardly facing surface 25 of the coupling flange 14.

In accordance with the invention, when insert 22 is inserted in the pipe end, either the outer surface of the cylindrical portion 23 or the end portion of the lining 11, or both, first has applied thereto a suitable solvent or sealing composition, so that, upon assembly, the insert and lining bond together and form a fluid-tight seal. And, in this respect, the invention is not to be limited to the use of solvents or compositions, as it is contemplated that suitable vulcanizing techniques, for example, may be utilized to effect the desired bonding of the insert to the lining.

Each pipe joint, connecting pipe sections end to end, utilizes two joint sections prepared in the manner described and, in FIG. 3, a second joint section is illustrated and the various parts thereof are designated by primed numerals corresponding to the numerals 10–25 heretofore referred to. To connect the joint sections together, and form a complete pipe joint, the flanges 26, 26' of the respective flanged coupling members are secured together by means of a plurality of bolt and nut assemblies 27–28. The flange portions 24, 24' of the inserts, 22, 22' are pressed tightly together and, advantageously, the contacting surfaces of the flanges 24, 24' are sealed as by means of a suitable gasket 29.

The new pipe joint is advantageous, in that it may be assembled, in its entirety, in the field, where the pipe sections are cut to length. With the new joint, the pipe sections may be lined prior to shipment to the job site, and it is unnecessary to ship the pipe sections out, after cutting, for lining, relining or otherwise, as has usually been necessary in the past.

Another advantageous feature of the new joint is that only a minimum of equipment is required at the job site. Thus, the basic tools required are a pipe cutter, a suitable drill and a wrench.

It should be understood, however, that the specific form of the invention herein illustrated and described is intended to be representative only, as certain changes may be made therein without departing from the clear teachings of the disclosure. In addition, the invention is believed to reside in certain of the specific elements per se, as well as in the novel combination thereof. Accordingly, reference should be made to the following appended claims in determining the full scope of the invention.

I claim:

1. A plastic lined pipe joint comprising a pair of pipe sections arranged end to end, said pipe sections having plastic linings extending substantially throughout their lengths, flanged coupling members received over the adjacent ends of the pipe sections and having end faces substantially flush with the ends of said pipe sections, said coupling members and the walls of said pipe sections including the plastic lining thereof defining a plurality of radially aligned holes, a plurality of bolt-like fasteners received in said holes and rigidly attaching said coupling members to the ends of said pipe sections, said bolt-like fasteners having enlarged heads received substantially entirely within the circumferential extent of the holes in said lining and bearing directly upon the inner walls of the pipe sections, flanged insert means of plastic material received in the adjacent ends of said pipe sections, said insert means being adapted to cover end portions of said pipe lining and said insert means having flange means extending radially outwardly and at least partially covering said end faces, said insert means being bonded to said lining entirely about the circumferential extent of said holes, and means for fastening the flanges of said coupling members together to draw said pipe sections axially toward each other.

2. The pipe joint of claim 1, in which the fastening elements are bolts having head portions substantially flush with said lining and having threaded portions projecting radially outward of the walls of said pipe sections.

3. The pipe joint of claim 1, in which the insert means comprises separate flanged inserts for each pipe section, and the flanges of the inserts are pressed into abutting relation.

References Cited in the file of this patent

UNITED STATES PATENTS

| | | |
|---|---|---|
| 544,147 | Webb | Aug. 6, 1895 |
| 1,907,120 | Rishel | May 2, 1933 |
| 2,065,480 | Soper | Dec. 22, 1936 |
| 2,270,089 | Stout | Jan. 13, 1942 |
| 2,568,414 | Russ | Sept. 18, 1951 |

FOREIGN PATENTS

| | | |
|---|---|---|
| 526,147 | Belgium | Aug. 2, 1954 |
| 318,957 | Switzerland | Mar. 15, 1957 |